United States Patent [19]

Calevo et al.

[11] Patent Number: 4,634,216
[45] Date of Patent: Jan. 6, 1987

[54] DEVICE FOR QUICKLY CONNECTING OPTICAL FIBERS

[75] Inventors: Robert Calevo, L'Hay les Roses; Vincent Dewez, Paris; Marcel Garcia, Domont, all of France

[73] Assignees: Societe Anonyme de Telecommunications (SAT); Societe Industrielle de Liaisons Electroiques, both of France

[21] Appl. No.: 568,504

[22] Filed: Jan. 5, 1984

[30] Foreign Application Priority Data

Jan. 5, 1983 [FR] France ............................... 83 00076

[51] Int. Cl.⁴ .............................................. G02B 6/36
[52] U.S. Cl. ............................ 350/96.21; 350/96.20
[58] Field of Search ........................... 350/96.21, 96.20

[56] References Cited

U.S. PATENT DOCUMENTS

| 4,146,301 | 3/1979 | Cherin et al. | 350/96.21 |
|---|---|---|---|
| 4,214,812 | 7/1980 | de Mendez | 350/96.21 |
| 4,252,407 | 2/1981 | Bubanko et al. | 350/96.21 |
| 4,274,708 | 6/1981 | Cocito et al. | 350/96.21 |
| 4,276,113 | 6/1981 | Carlsen et al. | 350/96.21 X |

FOREIGN PATENT DOCUMENTS

| 2803656 | 8/1978 | Fed. Rep. of Germany | 350/96.21 |
|---|---|---|---|
| 0148456 | 12/1978 | Japan | 350/96.21 |
| 1490235 | of 0000 | United Kingdom . | |

OTHER PUBLICATIONS

"Spring-Retentive V-Groove Splice for Joining Groups of Optical Fibers", by Yasuhiro et al, Applied Optics, 1 Aug. 1982/vol. 21, No. 15.
Design and Performance of the FT3 Lightguide Trunk Transmission Medium, International Conference on Communication, vol. 1, pp. 6.1.1 to 6.1.8, Jun. 14-18, 1981, Denver, Colo.

Primary Examiner—William L. Sikes
Assistant Examiner—Akm E. Ullah
Attorney, Agent, or Firm—Lowe, Price, LeBlanc, Becker & Shur

[57] ABSTRACT

Two optical fibers are connected by a device including a base member having a central groove for aligning and abutting the fiber ends. To connect the fibers quickly without having to dismantle any device members, the device comprises a one piece bent spring fastener having a U-shaped cross-section. Natural flexion of a flexible arm of the spring fastener presses the fiber ends into the groove in the immediate vicinity of a fiber endface connection plane. The other arm is anchored to the base member. To connect the fibers, a tool deflects the flexible arm away from the base member and the fiber ends are slide into the groove. The device is in a very slim-like housing and several can be stacked to create a multifiber connecting rack.

19 Claims, 14 Drawing Figures

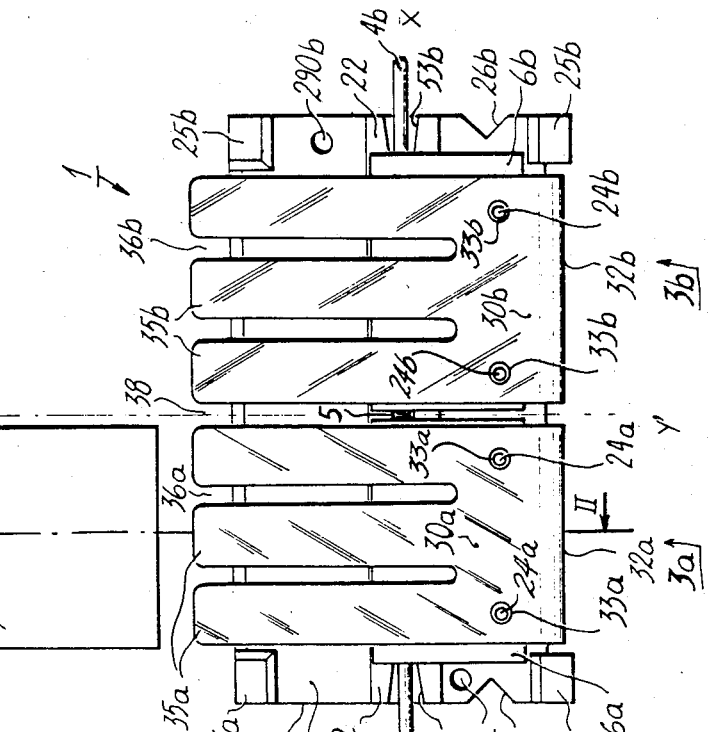

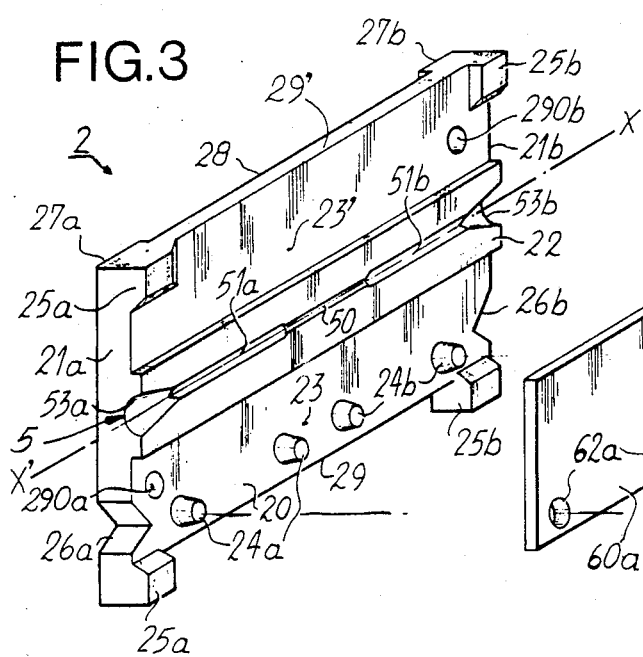
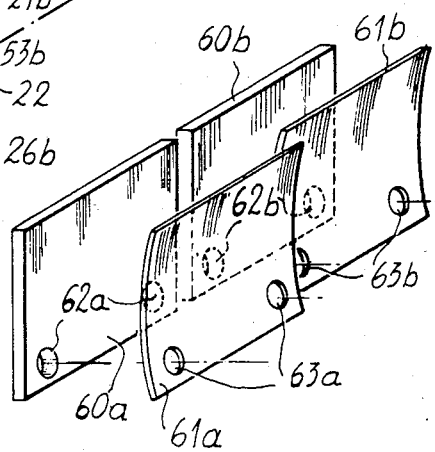
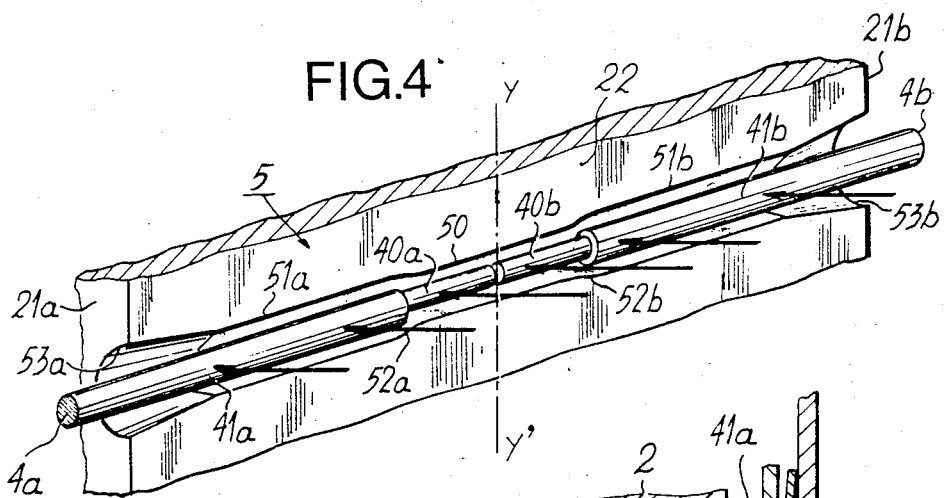
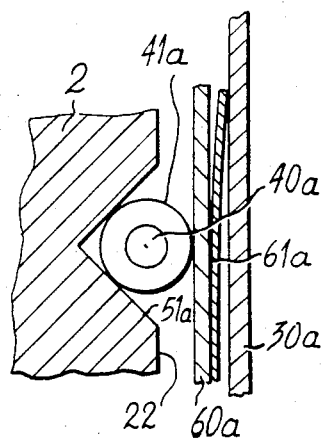

DEVICE FOR QUICKLY CONNECTING OPTICAL FIBERS

BACKGROUND OF THE INVENTION

1. Field of the Invention

This invention relates to a device for connecting ends of two optical fibers comprising a base member including, on a major side, a fiber end-receiving groove for aligning and abutting the fiber ends on either side of a connection plane, and a bent spring fastener including on either side of a fastener bend, a flexible portion over the major side of the base member and a second portion contacting the base member.

2. Description of the Prior Art

A device for connecting optical fibers from two linear arrays or ribbons of optical fibers situated two-by-two on a flat base member including several parallel spaced fiber-receiving grooves is described in French patent application No. 2,255,618. With reference to FIGS. 3 and 5 in this patent application, a bent spring fastener contains two straight-armed set-square type members oppositely arranged along a groove designed to receive two optical fibers included in the arrays to be abutted. Each set-square member has a flexible arm which is parallel to the groove and pinches a section of an optical fiber remote from the fiber connection plane. The optical fiber passes through the other arm of the set-square member which lies perpendicular to the groove, and which is simply slotted in a notch in the base member. The flexible arms of the two set-square members serve the sole purpose of holding the two fibers in the groove. To fix the fiber ends in the groove and hold the two fibers abutted endface-to-endface therein a pressing bar coated with rubber, bears in pressure contact in line with the fiber connection plane above the groove and between the flexible arms of the set-square members. The pressing bar must be withdrawn in order to introduce into or extract the fiber ends from the groove and to separate the flexible arms of the set square members from the base member. Further, by separating the flexible arms of the set-square members, said set-square members can be withdrawn from the base member.

Other devices for connecting two linear arrays or ribbons of optical fibers comprising U-shaped spring fasteners, analogous to clips, are disclosed in the U.S. Pat. No. 4,146,301 with reference to FIG. 3 and in the article by M. I. Schwartz entitled "DESIGN AND PERFORMANCE OF THE FT3 LIGHTGUIDE TRUNK TRANSMISSION MEDIUM", INTERNATIONAL CONFERENCE ON COMMUNICATIONS, Vol. 1, pages 6.1.1. to 6.1.8., June 14–18, 1981, Denver, Colo. (U.S.), with reference to FIG. 6. The U-shaped spring fasteners do not directly press the optical fibers in the grooves of a grooved flat base member or substrate, instead the spring fasteners are used in assembling the various components of the connecting device, such as the three components of a cover and the base member, or intermediate components and the composite base member. The U-shaped spring fasteners are not secured to the base member but slip over the base member and cover or the intermediate components to secure the base member and the cover in mating engagement. Here again, optical fiber connection requires disassembling and assembling operations on the components making up the device.

Additionally, the above-described connecting devices are relatively bulky and do not permit two optical fibers included in two optical fiber cables to be individually connected.

OBJECTS OF THE INVENTION

The main object of this invention is to provide a device for quickly connecting two optical fibers without resorting to dissassembling any of the members constituting the device.

A further object of this invention is to reduce the manufacturing cost of an optical fiber connecting device by minimizing the number of parts in the device.

SUMMARY OF THE INVENTION

Accordingly, a device for connecting two optical fibers comprises a base member and a bent spring fastener. A first major side of the base member includes a fiber end-receiving groove for aligning and abutting ends of the two fibers on either side of a fiber endface connection plane. A bent spring fastener has, on either side of a fastener bend, a flexible first portion above the base member first major side and a second portion contacting the base member. The flexible portion of the spring fastener has one edge opposite the fastener bend. The flexible portion edge is free and accessible from one of two edges of said base member on either side of said groove to deflect only the flexible portion in front of the base member first major side when the ends of said two fibers are inserted in the groove. The second portion of the spring fastener is anchored to the base member. The flexible portion presses the fiber ends into the groove at least in the immediate vicinity of the fiber endface connection plane.

The bending load exerted by the first portion of the spring fastener on the base member and hence on the end sections of the two fibers in the groove provides an efficient hold on the fibers in the groove, thereby affording sufficient tensile resistance. The alignment of the fiber end sections endface-to-endface as slidably introduced into the groove between the base member and the flexible portion of the spring fastener is as accurate as in known connecting devices. The alignment and abutment of the fiber end sections in the groove are maintained with the help of a pressing force on the fiber end sections; the force is exerted by the flexible portion of the spring fastener in the immediate vicinity of the fiber endface connection plane, thereby ensuring transmission of optical signals in the fibers under most satisfactory conditions.

The procedure of connecting the prepared fiber ends is simply and quickly implemented. The fiber end connection merely entails deflecting the accessible free edge of the flexible portion on the bent spring fastener away from the grooved side of the base member and slidably inserting the fiber ends in the groove.

A further advantage of the connecting device resides in a low manufacturing cost since the device can consist of only two members, namely the base member and the spring fastener. The second portion of the bent spring fastener can, in this respect, be anchored to the base member with the addition of no extra members. According to a preferred embodiment, the spring fastener has a U-shaped cross-section having arms forming the first and second portions of the spring fastener and tightly fitting around the major sides of the base member. The arm forming the second portion can tightly embrace two opposite edges of the base member substantially parallel to the groove and is thus integral with the base member even when the flexible arm of the spring fastener is deflected from the base member to introduce the fibers.

According to a further aspect of the invention, the configuration of the fiber connecting device is such that the device resembles a very flat housing, some 3 mm thick. Stacking several such housings two by two opposite each other is possible thereby constituting a multifiber connecting device. The multifiber connecting device can connect several multifiber cables or build up a column in a telephone exchange distribution frame connecting optical fiber cables via optical fiber jumpers.

The fiber connecting device contains a gel at least in the region of the fiber endface connection to provide refractive index continuity. According to the invention, the gel does not run under its own weight and does not ooze out through openings in the connecting device, whereby fiber end sections may be inserted and withdrawn several times without adding any gel since the gel is not drawn outwards by the fiber end sections. The gel is also self-cleaning and collects any dust that may happen to be on the fiber end sections while being introduced into the device.

BRIEF DESCRIPTION OF THE DRAWING

Other objects, advantages and features of this invention will become clear from the following detailed description of several preferred embodiments of the invention with reference to the corresponding accompanying drawings in which:

FIG. 1 is a front view of a device having two spring fasteners for connecting the ends of two optical fibers;

FIG. 2 is a partial cross-sectional view taken along the line II—II in FIG. 1, wherein plates, spring leaves and a deflecting tool;

FIG. 3 is a perspective view of the base member of the connecting device;

FIG. 4 is a detailed view of the base member central groove containing the aligned and abutted end sections of two optical fibers;

FIG. 5 is a perspective view of two pairs of intermediate plates and curved spring leaves between the base member and the free flexible arm of the spring fastener;

FIG. 6A is a cross-sectional view, taken along the line II—II in FIG. 1, showing the connecting device with the plates and spring leaves;

FIG. 6B is a cross-sectional view of a lateral groove portion of the central groove depicting how a cladded section of an optical fiber is pressed by the spring fastener free flexible arm via a plate and a spring leaf;

FIG. 7 is a cross-sectional view similar to FIG. 6A depicting how the spring fastener free flexible arm is deflected with respect to a major grooved side of the base member by means of a deflecting tool, to insert a fiber end in the groove;

DESCRIPTION OF THE PREFERRED EMBODIMENTS

Figures 8A, 8B:
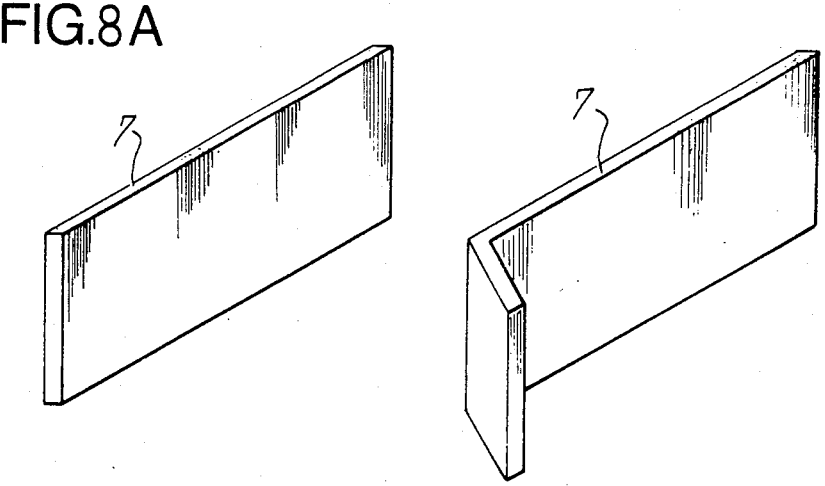
FIGS. 8A and 8B are perspective views of deflecting tools.

As depicted in FIGS. 1 and 2, a fiber connecting device in accordance with one embodiment of the invention has an overall shape analogous to a compact and slim-line parallelepipedal housing 1 that is a few millimeters thick. Housing 1 comprises essentially a thin parallelepipedal base member 2 and two spring fasteners 3a and 3b having a U-shaped cross-section.

In FIG. 1, housing 1 is depicted in a longitudinal vertical position. Housing 1 is symmetrical with respect to a small vertical and transverse central axis Y'Y defining a connection plane for the endfaces of two optical fibers 4a and 4b to be connected. In what follows, symmetrical members, sections, parts or portions are designated by the same reference number to which indicies a and b are respectively added for members located in the housing halves to the left and right sides of axis Y'Y as indicated in FIG. 1.

The base member 2 constitutes the prime member of housing 1 and a means for bearing the ends of optical fibers 4a and 4b. As illustrated in FIGS. 3 and 4, a rectilinear fiber alignment groove 5 lies along a longitudinal and horizontal axis X'X substantially central to the housing, in a major front side 20 of base member 2 inside housing 1. The composite groove 5 has a V-shaped or clipped V-shaped cross-section. Each section of groove 5 comprises two generating lines which are separated by an angle of 60° to 120° with respect to the longitudinal axis X'X and against which a section of optical fiber is pressed.

The groove 5 according to the illustrated embodiment is composed of a central groove section 50 and two lateral groove sections 51a and 51b, having cross-sectional areas greater than the cross-sectional area of central section 50 and extending from the ends of central section 50. As shown in detail in FIG. 4, groove section 50 is designed to receive uncladded sections 40a and 40b of the ends of fibers 4a and 4b over a typical length of 8 mm to align uncladded sections 40a and 40b along the longitudinal axis X'X and abut the endfaces of sections 40a and 40b into the connection plane defined by the vertical axis Y'Y. Each of lateral groove section 51a and 51b is deeper than central groove section 50 and receives a cladded section 41a, 41b of respective fiber 4a, 4b. The depths of groove sections 50, 51a and 51b are such that when uncladded fiber sections 40a and 40b are firmly laid along two generating lines of central groove section 50 and when cladded fiber sections 41a and 41b are firmly laid along two generating lines of lateral groove sections 51a and 51b, the core axes of optical fibers 4a and 4b are colinear and the fiber end sections protrude from front major side 20 of base member 2 by about one third of the fiber core diameter.

The groove 5 further comprises two shoulders 52a and 52b that mark the cross section transitions between central groove section 50 and lateral groove sections 51a and 51b, and two splays 53a and 53b that widen the cross-section of lateral groove sections 51a and 51b thereby extending into small vertical lateral edges 21a and 21b of base member 2. Shoulders 52a and 52b generally receive the transitions between uncladded fiber sections 40a and 40b, as well as cladded fiber sections 41a and 41b of respective optical fibers 4a and 4b.

Splays 53a and 53b ease fiber-end insertion into groove 5.

As depicted in FIGS. 2 and 3, groove 5 is included in a longitudinal projecting strip 22 extending from front major side 20 of the base member. One of concomitant longitudinal surfaces 23 and 23' set back from strip 22 allows a tool to be inserted in order to deflect one of free arms of the spring fasteners 3a and 3b, as seen hereinafter.

The base member 2 further includes two pairs of tapered locating studs 24a and 24b longitudinally aligned along lower surface 23, two pairs of substantially prismatic bosses 25a and 25b at the four corners of front major side 20, two V-shaped notches 26a and 26b in the lower portion of lateral edges 21a and 21b, and two small vertical, lateral projecting strips 27a and 27b at the extremities of rear major side 28 of base member 2. The rôle played by these various portions of base member 2 are explained later.

A description is now be given of spring fastener 3a in relation to fiber 4a. The other spring fastener 3b is identical to and coplanar with spring fastener 3a and fulfils the same function for fiber 4b. Spring fasteners 3a and 3b are arranged symmetrically with respect to the connection plane Y'Y and in the immediate vicinity of plane Y'Y.

Spring fastener 3a has a U-shaped transverse cross-section that defines a first front vertical, flexible arm 30a and a second rear vertical arm 31a anchored to the base member in likeness to a catch plate. The arms 30a and 31a are interlinked via a lower 180° bend 32a in the U-shaped cross section. The fastener 3a is introduced from longitudinal lower edge 29 of base member 2 by pushing away flexible arm 30a in order to clear locating studs 24a and 24b, and by slipping second arm 31a against base member rear major side 28 until locating studs 24a engage locating holes 33a in arm 30a. The fastener 3a hugs base member 2 by means of front arm 30a that is pressed due to its own bending force toward front major side 20 of the base member and in particular against longitudinal feather 22, and by means of rear arm 31a that is in pressure contact due to its own bending force against rear major side 28 of the base member. The bend 32a in fastener 3a butts up against lower edge 29 of the base member and is thus parallel to groove 5.

Springs fastener 3a covers half major sides 20 and 28 of the base member to the left hand side, between the feather 27a and boss 25a assembly and the axis Y'Y. Likewise, spring fastener 3b covers half major sides 20 and 28 of the base member to the right hand side, between the feather 27b and boss 25b assembly and the axis Y'Y. The spring fasteners 3a and 3b are contained in housing 1, i.e. in the base member 2 envelope marked off by strips 27a and 27b and bosses 25a and 25b having a thickness greater than the thickness of the arms of spring fasteners 3a and 3b, as illustrated in FIG. 2. The lower bosses 25a and 25b are larger than the radius of bends 32a and 32b of spring fasteners 3a and 3b.

In the lower portion of front flexible arm 30a, two holes 33a come to rest on the tapered tips of two respective truncated studs 24a, thereby vertically immobilizing at least arm 30a on the base member 2. The upper free edge 34a of rear arm 31a is folded over toward longitudinal upper edge 29' of base member 2 as shown in FIG. 2, such that edges 29 and 29' of the base member are truly captured by bend 32a and edge 34a of spring fastener 3a. The rear arm 31a remains pressed against rear side 28 when front arm 30a is deflected from front side 20, and thus stays anchored to the base member 2.

The upper portion of the front arm 30a of fastener 3a includes three sub-arms 35a that extend perpendicularly to groove 5 at least as far as longitudinal surface 23 subjacent strip 22 and that are spaced by narrow vertical slits 36a. In groove sections 51a and 50, the sub-arms 35a exert separate localized pressures at least against cladded section 41a of respective optical fiber 4a and uncladded section 40a of fiber 4a in the immediate vicinity of plane Y'Y, and thus make it possible to marry substantially the respective surfaces opposite in front side 20 of the base member.

With reference to FIGS. 5, 6A and 6B, a thin rectangular plate 60a and a rectangular curved spring leaf 61a are superimposed and are interposed in the lower part of housing 1, between front side 20 and free front arm 30a to ease fiber 4a insertion. The spring leaf 61a is lodged between front arm 30a and plate 60a. Plate 60a faces feather 22 and surface 23 of the base member. The convex side of spring leaf 61a pulls thin plate 60a to groove 5 in feather 22. Plate 60a and spring leaf 61a comprise locating holes 62a and 63a cooperating with the two respective studs 24a. The plate 60 and spring leaf 61a have heights substantially equal to half the height of front side 20 so that fiber 4a can be pressed into groove sections 51a and 50.

As depicted in FIGS. 6A and 7, free upper edge 37a of front arm 30a is accessible above upper bevelled longitudinal edge 29' of base member 2, allowing introduction of a tool 7 between upper front surface 23' of the base member and edge 37a of arm 30a in order to deflect flexible arm 30a by few hundredths of a millimeter. As shown in FIGS. 8A and 8B, tool 7 is a straight plate that is substantially equal in width to arm 30a. By means of a straight (FIG. 9A) or preferably bent over (FIG. 9B) end of tool 7, it is possible by a lever action to deflect upper edge 37a of arm 30a against the bending force of arm 30a. The spring leaf 61a becomes curved and pushes thin plate 60a against strip 22 including groove 5. The resiliency of spring leaf 61a is low, enabling fiber 4a between plate 60a and groove sections 51a and 50 while avoiding a curvature of the end section of fiber 4a. The inserted fiber can deflect plate 60a by a few micrometers.

Other structural and lay-out variations of the various portions making up the elementary connecting device described hereabove can be envisaged.

When the concentricity of fiber protective cladding can be retained as a surface reference, groove 5 bears a constant cross-section over its entire length, substantially equal to one-half of the cross-section of lateral grooved sections 51a and 51b.

Figure 9:
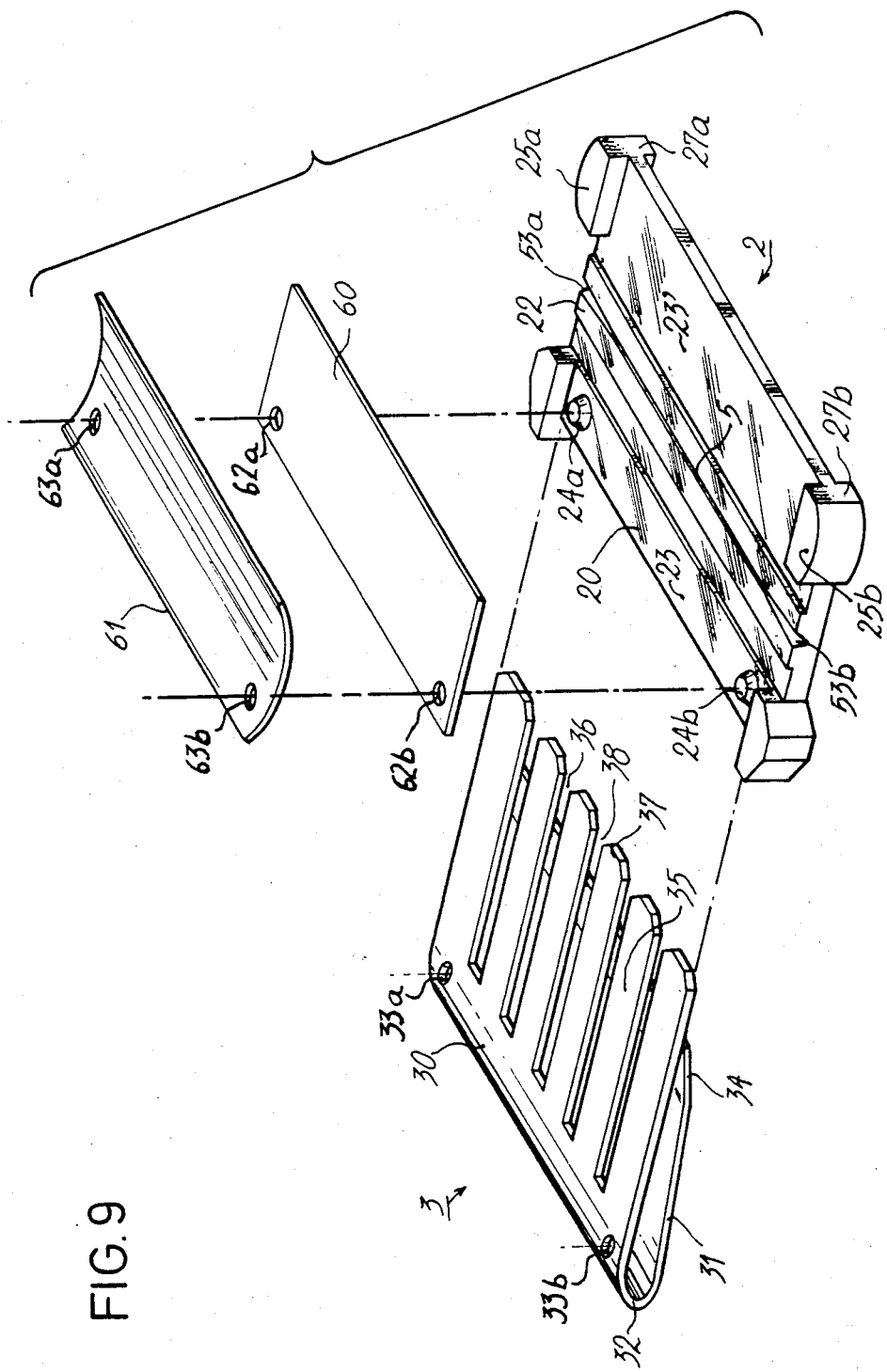
FIG. 9 is a perspective view of another embodiment of a fiber connecting device having one spring fastener.

The two U-shaped spring fasteners 3a and 3b can be replaced by a single U-shaped spring fastener 3, as shown in FIG. 9. The plates 60a and 60b and the spring leaves 61a and 61b are replaced by a single thin rectangular plate 60 and a single rectangular curved spring leaf 61 introduced between front face 20 and the free front arm 30 of the single spring fastener 3. Spring fastener 3 covers two major sides 20 and 28 of base member 2 between the boss 25a and feather 27a assemblage and the boss 25b and feather 27b assemblage. In this case, two central front sub-arms 35 are spaced by a vertical slit 38 centered on the central axis Y'Y. Slit 38 is very narrow in width so that one sub-arm 35 may be deflected and the respective fiber end section may be inserted without moving the other sub-arm and so that the end sections of the two fibers may be individually pressed at least in the immediate vicinity of the axis Y'Y.

Instead of each spring fastener such as fastener 3a being U-shaped, a spring fastener substantially set square-shaped with no rear arm can be envisaged. In a first variation, the small side of the set square replaces bend 32a and is slotted in an oblong hole parallel to base member lower edge 29 and above the latter. The edge of the small free side of the square opposite the square bend is fold against rear major side 28 of the base member in order to anchor the spring fastener to the base member. In a second variation, the small side of the square is secured to lower edge 29 by securing means such as rivets, welding or screws.

Members 2, 3a, 3b, 60a, 60b, 61a and 61b can be industrially manufactured on a production line. The base member 2 and plates 60a and 60b can be produced by molding or stamping for example and can be made of metal, thermoplastic, duroplastic or ceramic for example. Spring fasteners 3a, 3b and spring leaves 61a, 61b can also be made of metal or plastic. The constituent materials making up the members in the connecting device preferably exhibit an expansion coefficient substantially equal to the expansion coefficient of the optical fibers thereby obviating any disturbance at the fiber connection arising from variations especially in temperature and humidity of the ambient surroundings.

The operations of removal, where necessary, of fiber cladding and then cutting the fibers to length in terms of the lengths of groove sections 50 and 51a, 51b are performed in a suitable and known fashion. Before the fibers are positioned, the space between strip 22 of front side 20 of base member 2 and free arms 30a and 30b of spring fasteners 3a and 3b is filled with an index-matching material ensuring continuity in the refractive index in the connection plane Y'Y of fibers 4a and 4b endfaces. The index matching material can be silicon oil or grease or preferably a silicon gel. The silicon gel has sufficiently low hardness to allow the fiber end sections to be easily introduced and positioned. The gel does not run under its own weight; after injection into housing 1, the gel does not ooze out through openings 53a, 53b, 36a, 36b and 38 in the housing.

Once the fibers 4a and 4b have been inserted in groove 5, the silicon gel is automatically caught between the two endfaces of the fibers. The silicon gel has practically the same refractive index as the fibers thereby ensuring a fiber endface connection with no discontinuity in refractive index.

The silicon gel is, furthermore, self-cleaning, a property not inherent in silicon oil or grease. Should any dust inadvertently collect on the endface of a fiber before insertion in housing 1, the gel through its adhesive capacity wipes off the fiber end section, as it is inserted into the housing and thus into the gel, thereby gathering the dust.

A further feature of the silicon gel consists of its "self-healing" properties when the fibers are withdrawn from housing 1. Gel cohesion is stronger than gel adhesion to the surface of the fibers. Upon withdrawal of the fibers immersed in and closely surrounded by the gel, the gel closes in on the space created by the fiber withdrawal, and the fibers keep no trace of the gel. The gel is not drawn outwards by the fibers.

Figure 10:
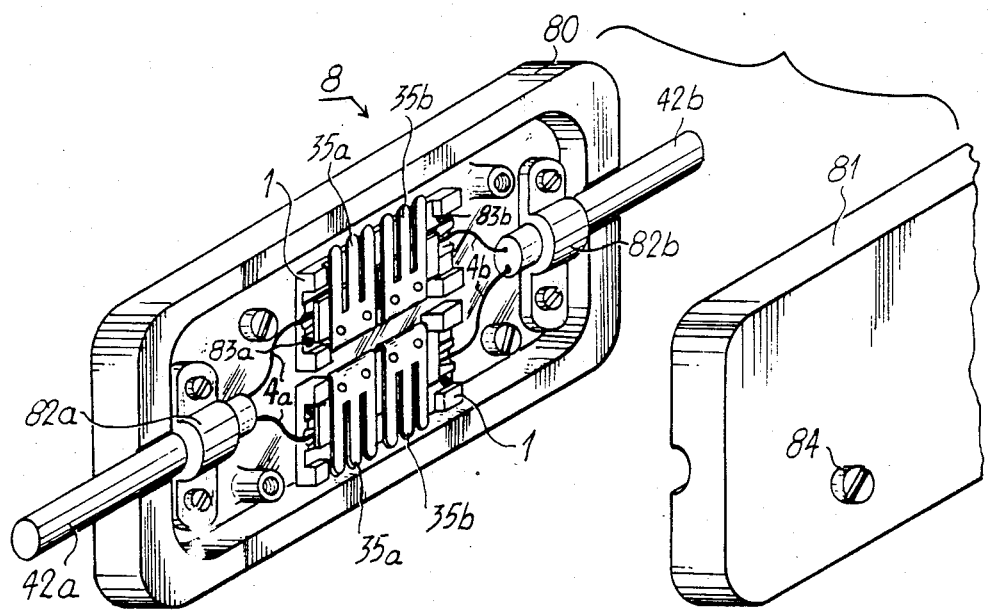
FIG. 10 is an exploded perspective view of an open connecting case containing two elementary connecting devices as shown in FIG. 1.

FIG. 10 is a perspective drawing of a device for connecting two cables 42a and 42b each having two optical fibers 4a and 4b. The cable connecting device comprises a hollow parallelepipedal case 8 having a base 80 and a lid 81. Anchored at the ends of the base longitudinal axis by two half-collars 82a and 82b screwed to the inner wall of base 80 are cladded end sections of the cables. Two elementary connecting housings 1 are each secured to the center of base 80 inner face by two screws 83a and 83b through holes 290a and 290b (FIG. 1) bored in base member 2 in the vicinity of lateral strips 27a and 28b. Each of the housings 1 connects an optical fiber 4a from cable 42a to an optical fiber 4b from other cable 42b. The strips 27a, 27b on rear major sides 28 of the base members are in pressure contact with the inner wall of base 80. The housings are vertically juxtaposed top-to-bottom so as to provide easy access to edges 37a, 37b of front sub-arms 35a, 35b by means of a deflecting tool 7 such as the angled tool depicted in FIG. 8B. Once the connection has been made, case 8 is hermetically closed by laying lid 81 and base 80 rim to rim and tightening them by two screws 84.

Figure 11:
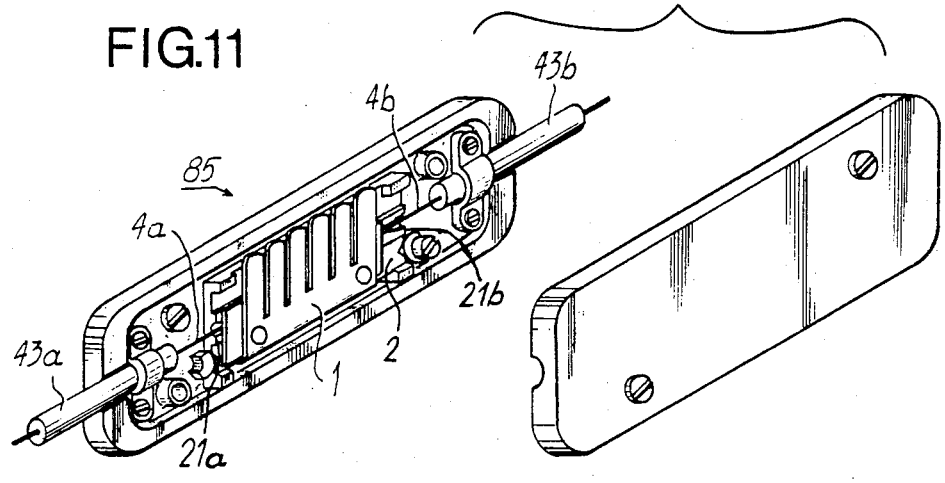
FIG. 11 is an exploded perspective view of another open connecting case containing one elementary connecting device as shown in FIG. 1.

FIG. 11 is a perspective view of another device for connecting two cables 43a and 43b each having an optical fiber 4a and 4b. The above device comprises a case 85 analogous to case 8 for enclosing an elementary connecting housing 1. Case 8 has suitable spaces between the uncladded ends of cables 43a and 43b and small lateral edges 21a and 21b of base member to lodge one or more spare loops of optical fibers 4a and 4b.

Figure 12:
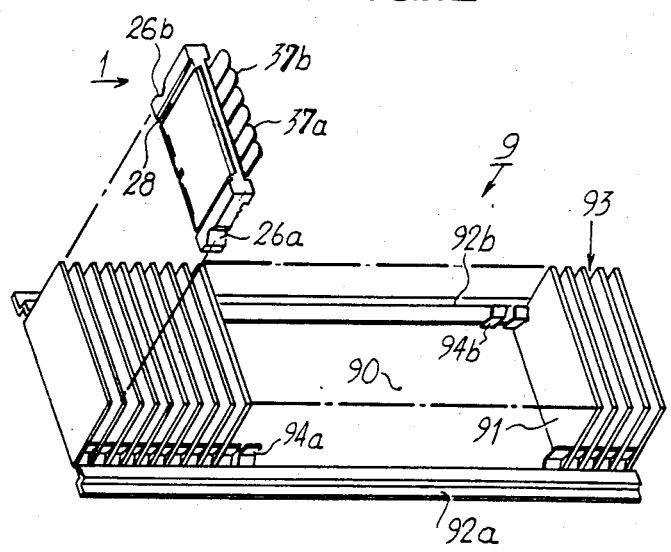
FIG. 12 is a perspective view of a support for stacking elementary connecting devices as shown in FIG. 1, with a view to forming a multifiber connecting device.

FIG. 12 is a perspective view of a multifiber connecting device 9 in which elementary connecting devices, each analogous to housing 1 described hereabove, can be stacked two-by-two opposite each other to form a rack. By using the multifiber device, it is possible, for example, to connect a linear array or ribbon or bundle of optical fibers to another analogous assembly of optical fibers. Each assembly of optical fibers can come from one or more cables in each of which the optical fibers are arranged in one or more ribbons or around one or more cylindrical rings, forming thus together a composite cable. Such a connecting device in rack form can be enclosed in a high capacity connecting and distributing box for optical fiber cables. The rack can also be designed to be fitted to a distribution frame or subframe for a telephone exchange. Each housing 1 serves as a cable head that connects an optical fiber from an external fiber cable to an optical fiber acting as a jumper link cord, or serves as a strip that connects an optical fiber jumper to an optical fiber from an internal cable feeding the switching equipments in the telephone exchange.

The multifiber connecting device 9 shown in FIG. 12 comprises a planar support 90 made up of a rectangular plate or frame, and a plurality of thin transverse rectangular partitions 91, perpendicular to support 90. The lower edge of each partition 91 is integral with two longitudinal rails 92a and 92b on support 90 by means of known securing methods. For example, when the partitions are designed to be removable, each partition comprises two lateral notches that snap over rails 92a and 92b, or two lateral slits that slide between rails 92a and 92b and support 90. The dimensions of a partition are approximately the same as the dimensions of major faces 20 and 28 of the housing 1 base member.

Two neighboring partitions 91 are separated by a gap, having a width substantially greater than the width of housing 1, bosses 25a and 25b and strips 27a and 27b. At the bottom of gap 93, two small angled and flexible tabs 94a and 94b are fixed to one of the neighboring partitions. Each housing 1 plugs in between two neighboring partitions 91 and is snap-locked via lateral notches 26a and 26b of base member 1 that are caught between two flexible tabs 94a and 94b. After locking, upper edges 37a and 37b of spring fastener arms 30a and 30b in housings 1 preferably protrude from all the parallel partitions 91 in order to ease fiber connecting operations by means of a tool 7.

What we claim is:

1. A device for connecting two optical fibers, said device comprising a base member including a first major side having a fiber end-receiving groove for aligning and abutting ends of said two fibers on either side of a fiber endface connection plane, and a bent spring fastener having a flexible first portion on either side of a fastener bend above said base member first major side and a second portion contacting said base member, said flexible portion of said spring fastener having one free edge opposite said fastener bend, said flexible portion edge being accessible from one of two edges of said base member on either side of said groove to deflect only said flexible portion in front of said base member first major side when said ends of said two fibers are inserted in said groove, said second portion of said spring fastener being anchored to said base member, and said flexible portion pressing said fiber ends into said groove at least in the immediate vicinity of said fiber endface connection plane.

2. The device claimed in claim 1 wherein said spring fastener has a U-shaped transverse cross-section with two arms forming said first flexible portion and said second portion, said arms embracing the base member major sides.

3. The device claimed in claim 2 wherein a free edge of said second arm opposite said bend and said bend of said spring fastener embrace two edges of said base member on either side of said groove.

4. The device claimed in claim 1 wherein said spring fastener is substantially contained in the base member envelope.

5. A device as claimed in claim 1 wherein said base member flexible portion includes locating holes, said grooved major side of said base member including locating studs, said studs and holes engaging each other between said groove and said bend in said spring fastener.

6. A device as claimed in claim 5 comprising at least one thin plate and at least one curved spring leaf interposed between said grooved major face of said base member and said flexible portion of said spring fastener, said plate and leaf each having locating holes engaged by said locating studs, said spring leaf having a convex side pulling said thin plate to said groove containing said fiber ends.

7. The device claimed in claim 1 wherein said spring fastener flexible portion is split on either side of said fiber endface connection plane into two individual flexible arms perpendicular to said groove, each flexible portion having a natural flexion pushing one respective optical fiber end into said groove.

8. The device claimed in claim 7 wherein each flexible arm is split into at least two individual flexible sub-arms, each of said two sub-arms having a natural flexion pushing respective sections of the end of said respective optical fiber into respective sections of said groove.

9. The device claimed in claim 1 wherein said free ends of said spring fastener flexible portion lies opposite a surface of said base member grooved major side set back from said groove enabling a tool to be inserted between said free edge and said set-back surface to deflect said flexible portion of said spring fastener against natural flexion thereof for enabling insertion of said optical fiber ends in said groove.

10. A device as claimed in claim 1 wherein said spring fastener includes two identical spring fasteners coplanarly arranged on either side of said fiber endface connection plane, in the immediate proximity of said connection plane.

11. A device as claimed in claim 1 in which a space between said base member and said spring fastener flexible portion around the groove is filled with a gel in contact with endfaces of said fiber ends, said gel being characterized by not running under its own weight and not oozing out through openings in the device.

12. The device claimed in claim 11 wherein said gel is characterized as not being drawn outwards from said device when said fiber ends are withdrawn from said groove.

13. The device claimed in claim 11 wherein said gel acts as a self-cleaning agent for said fiber ends.

14. A case of connecting first and second optical fiber cables each having two optical fibers,
said case comprising a base, a lid closing said base, and two devices for connecting one optical fiber from said first cable to one optical fiber from the second cable,
each of said connecting devices comprising a base member including a major side having a fiber end-receiving groove for aligning and abutting ends of said first cable fiber and said second cable fiber on either side of a fiber endface connection plane, and a bent spring fastener having a flexible first portion on either side of a fastener bend above said base member major side and a second porton contacting said base member, said flexible portion of said spring fastener having one free edge opposite said fastener bend, said flexible porton edge being accessible from one of two edges of said base member on either side of said groove to deflect only said flexible portion in front of said base member major side when said ends of said first cable fiber and second cable fiber are inserted in said groove, said second portion of said spring fastener being anchored to said base member, and said flexible portion pressing said ends of said first cable fiber and second cable fiber into said groove at least in the immediate vicinity of said fiber endface connection plane,
said base members of said two connecting devices being juxtaposed top-to-bottom in said base, said second portions of said spring fasteners of said two connecting devices lying between an inner face of said base and said base members, and said first flexible portions of said spring fasteners of said two connecting devices lying between said lid and said base members.

15. A multifiber connecting device for connecting first and second assemblies of optical fibers, said multifiber connecting devic comprising a plurality of substantially flat elementary connecting devices, each of said connecting devices connecting one optical fiber from said first assembly to one optical fiber from said second assembly,
each of said elementary connecting devices comprising a base member including a major side having a fiber end-receiving groove for aligning and abutting ends of said first assembly fiber and said second assembly fiber on either side of a fiber endface connection plane, and a bent spring fastener having a flexible first portion on either side of a fastener bend above said base member major side and a second portion contacting said base member, said flexible portion of said spring fastener having one free edge opposite said fastener bend, said flexible portion edge being accessible from one of two edges of said base member on either side of said groove to deflect only said flexible portion in front of said base member major side when said ends of said first assembly fiber and second assembly fiber are inserted in said groove, said second portion of said spring fastener being anchored to said base member, and said flexible portion pressing said ends of said first assembly fiber and second assembly fiber into said groove at least in the immediate vicinity of said fiber endface connection plane, said multifiber connecting device also comprising means for parallel stacking said base members of said elementary devices.

16. The multifiber connecting device claimed in claim 15 wherein said stacking means comprises a planar support having parallel partitions between which said base members of said elementary connecting devices are plugged.

17. The multifiber connecting device claimed in claim 16 wherein said partitions are removable.

18. The multifiber connecting device claimed in claim 16 wherein said support comprises flexible means between two neighboring partitions, said flexible means cooperating with two notches in two edges of the plugged-in base member of one elementary connecting device for locking said base member of said elementary connecting device, said notched edges lying substantially perpendicular to said groove in said base member.

19. The multifiber connecting device claimed in claim 15 wherein the adjacent stacked base members of two elementary connecting devices are arranged top-to-bottom.

* * * * *